United States Patent
Lee et al.

(10) Patent No.: US 9,836,144 B2
(45) Date of Patent: Dec. 5, 2017

(54) TOUCH PANEL

(75) Inventors: Keun Sik Lee, Seoul (KR); Byung Soo Kim, Seoul (KR); Sun Hwa Lee, Seoul (KR); Chung Won Seo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 434 days.

(21) Appl. No.: 13/813,314

(22) PCT Filed: Jul. 29, 2011

(86) PCT No.: PCT/KR2011/005635
§ 371 (c)(1),
(2), (4) Date: Apr. 9, 2013

(87) PCT Pub. No.: WO2012/015284
PCT Pub. Date: Feb. 2, 2012

(65) Prior Publication Data
US 2013/0194220 A1    Aug. 1, 2013

(30) Foreign Application Priority Data
Jul. 30, 2010  (KR) .................. 10-2010-0074419
Jul. 30, 2010  (KR) .................. 10-2010-0074422

(51) Int. Cl.
*G06F 3/041*    (2006.01)

(52) U.S. Cl.
CPC .... *G06F 3/041* (2013.01); *G06F 2203/04103* (2013.01)

(58) Field of Classification Search
CPC ......... G02B 1/116; G06F 3/041; G06F 3/044; G06F 3/045
See application file for complete search history.

(56) References Cited

U.S. PATENT DOCUMENTS

| | | | |
|---|---|---|---|
| 6,727,566 B1* | 4/2004 | Fukui et al. | 257/437 |
| 8,049,127 B2 | 11/2011 | Yamaue et al. | |
| 8,068,186 B2 | 11/2011 | Aufderheide et al. | |
| 2002/0197824 A1* | 12/2002 | Katsuragawa | 438/437 |
| 2005/0083307 A1* | 4/2005 | Aufderheide et al. | 345/173 |
| 2005/0146516 A1* | 7/2005 | Nishiyama | G06F 3/045 345/176 |

(Continued)

FOREIGN PATENT DOCUMENTS

JP    2004-184579 A    7/2004
JP    2004-291499 A    10/2004

(Continued)

OTHER PUBLICATIONS

Office Action dated Feb. 18, 2014 in Japanese Application No. 2013-521720.

(Continued)

*Primary Examiner* — Dorothy Harris
(74) *Attorney, Agent, or Firm* — Saliwanchik, Lloyd & Eisenschenk

(57) ABSTRACT

A touch panel according to the embodiment includes a substrate having a first surface and a second surface opposite to the first surface; an intermediate layer on the first surface of the substrate; and a transparent electrode on the intermediate layer. A touch panel according to another embodiment includes a substrate having a first surface and a second surface opposite to the first surface; a transparent electrode on the first surface of the substrate; and an anti-reflective layer on the transparent electrode.

15 Claims, 3 Drawing Sheets

(56) References Cited

U.S. PATENT DOCUMENTS

| | | | | |
|---|---|---|---|---|
| 2008/0138589 | A1* | 6/2008 | Wakabayashi | H01H 13/83 428/195.1 |
| 2009/0135151 | A1* | 5/2009 | Sun | G06F 3/041 345/173 |
| 2009/0188726 | A1* | 7/2009 | Chang | G06F 3/045 178/18.03 |
| 2009/0244028 | A1* | 10/2009 | Matsuo | G06F 3/044 345/174 |
| 2010/0013798 | A1* | 1/2010 | Nakajima | G06F 3/044 345/176 |
| 2010/0164881 | A1* | 7/2010 | Kuo | G06F 3/044 345/173 |
| 2010/0171718 | A1* | 7/2010 | Denda | G06F 3/044 345/173 |
| 2010/0233930 | A1* | 9/2010 | Ishida | G06F 3/0412 445/24 |
| 2011/0109590 | A1 | 5/2011 | Park | |
| 2011/0187666 | A1* | 8/2011 | Min | 345/173 |

FOREIGN PATENT DOCUMENTS

| | | |
|---|---|---|
| JP | 31-44241 U | 8/2008 |
| JP | 2009-129225 A | 6/2009 |
| JP | 2009-259203 A | 11/2009 |
| JP | 2010-160917 A | 7/2010 |
| KR | 10-2007-0017296 A | 2/2007 |
| KR | 10-2009-0110770 A | 10/2009 |
| WO | WO-2009157645 A1 | 12/2009 |

OTHER PUBLICATIONS

International Search Report in International Application No. PCT/KR2011/005635, dated Jul. 29, 2011.

Office Action dated Oct. 14, 2014, in Japanese Application No. 2013-521720.

Office Action dated Oct. 27, 2015 in Japanese Application No. 2015-002904.

* cited by examiner

[Fig. 1]
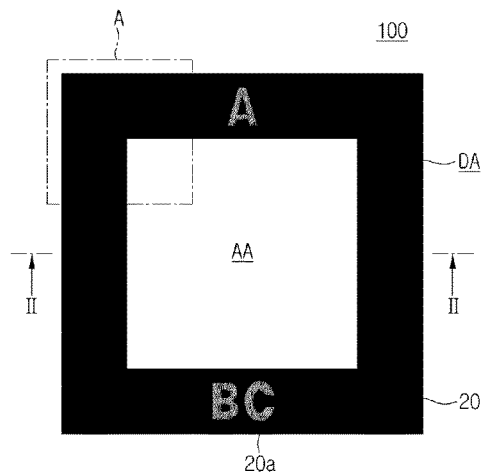
[Fig. 2]
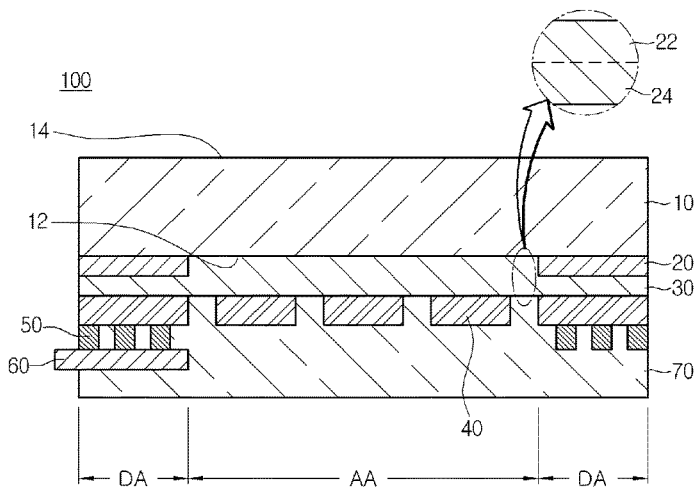
[Fig. 3]
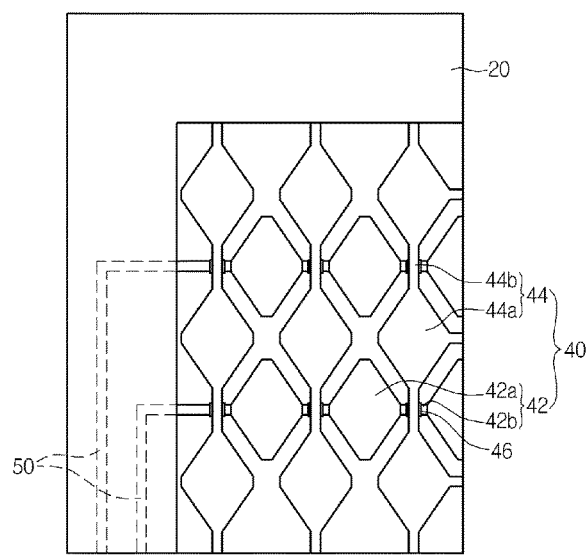

[Fig. 4]
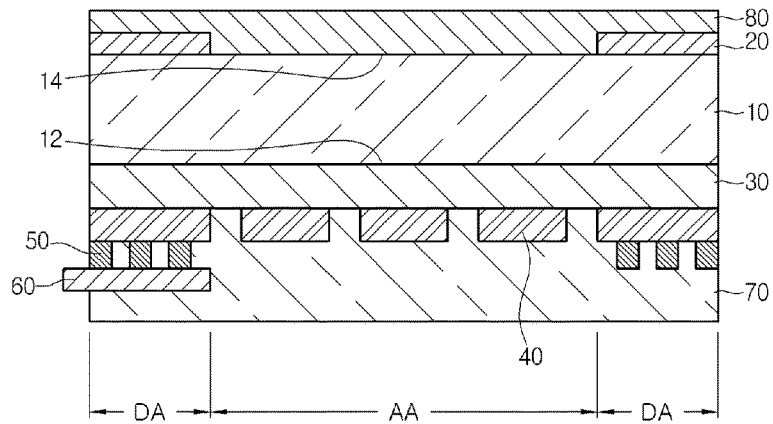
[Fig. 5]
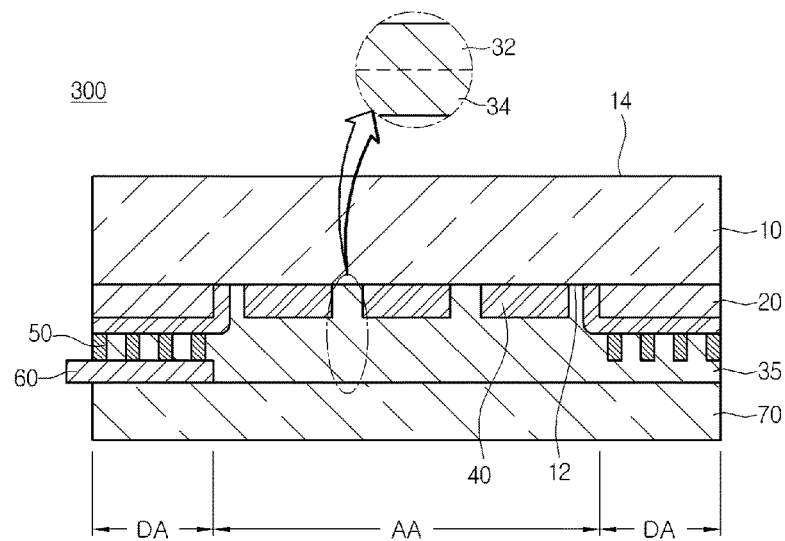
[Fig. 6]
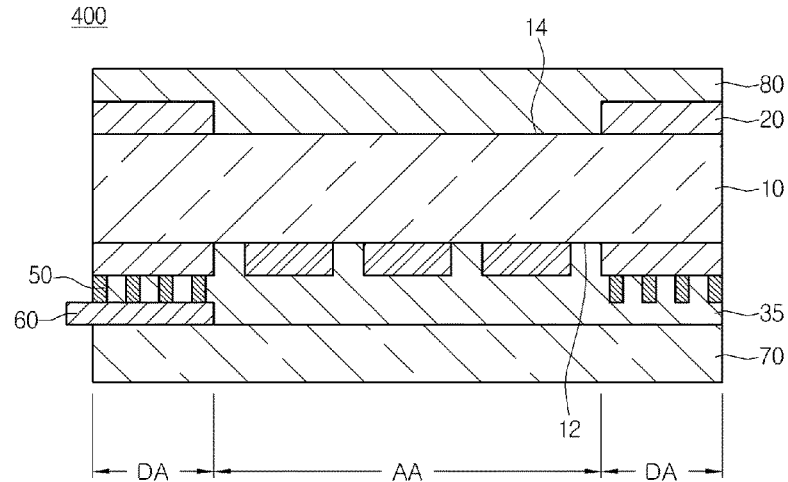

[Fig. 7]
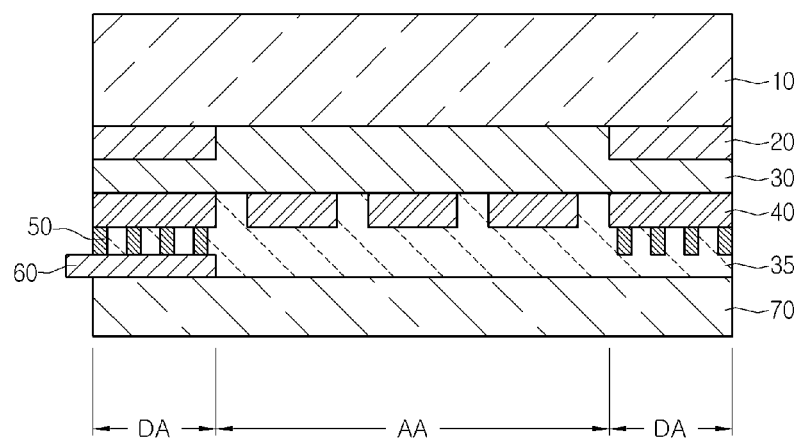

TOUCH PANEL

CROSS-REFERENCE TO RELATED APPLICATIONS

This application is the U.S. national stage application of International Patent Application No. PCT/KR2011/005635, filed Jul. 29, 2011, which claims priority to Korean Application Nos. 10-2010-0074419, filed Jul. 30, 2010 and 10-2010-0074422, filed Jul. 30, 2010, the disclosures of each of which are incorporated herein by reference in their entirety.

TECHNICAL FIELD

The disclosure relates to a touch panel.

BACKGROUND ART

Recently, touch panels are employed in various electronic appliances to allow a user to input data by touching an image displayed on a display device using an input device, such as a finger or a stylus.

Such touch panels are mainly classified into resistive touch panels and capacitive touch panels. According to the resistive touch panel, an electrode is shorted as pressure is applied thereto from an input device so that a position is detected. According to the capacitive touch panel, capacitance between electrodes is varied as a finger touches the touch panel and a position is detected based on the capacitance variation.

When the touch panel is employed in various display devices, a substrate formed with a logo and a shatter prevention film is manufactured separately from a film formed with a transparent electrode, and then the substrate is bonded with the film by using an OCA (optically clear adhesive).

However, the OCA represents the inferior workability, so the bonding defect may occur. In addition, the light transmittance may be lowered due to the multiple stack structure of the film and the substrate. Further, since the film formed with the transparent electrode is mainly obtained through importation, the film is expensive, so the manufacturing cost is increased.

DISCLOSURE OF INVENTION

Technical Problem

The embodiment provides a touch panel capable of improving light transmittance while lowering the defect rate and the manufacturing cost.

Solution to Problem

A touch panel according to the embodiment includes a substrate having a first surface and a second surface opposite to the first surface; an intermediate layer on the first surface of the substrate; and a transparent electrode on the intermediate layer.

A touch panel according to another embodiment includes a substrate having a first surface and a second surface opposite to the first surface; a transparent electrode on the first surface of the substrate; and an anti-reflective layer on the transparent electrode.

Advantageous Effects of Invention

According to the touch panel of the embodiment, the outer dummy layer and the transparent electrode are formed on the same substrate, so the OCA representing the inferior workability is not necessary. Thus, the defect rate can be reduced and the reliability can be improved. In addition, the stack structure of the touch panel is simplified, so that the light transmittance can be improved and the thickness and the manufacturing cost can be reduced.

In addition, according to the touch panel of the embodiment, the intermediate layer capable of performing the index matching is interposed between the substrate and the transparent electrode, so that the transmittance, reflectance and yellowish characteristics can be improved and the transparent electrode can be directly formed on the intermediate layer. Therefore, the light transmittance can be improved and the manufacturing cost can be reduced. In addition, the transparent electrode including the transparent conductive material may be invisible due to the index matching. Thus, visibility of the display device employing the touch panel can be improved.

Meanwhile, according to the touch panel of another embodiment, the anti-reflective layer is deposited on the transparent electrode after the transparent electrode has been deposited on the substrate, so that the anti-reflection efficiency and the light transmittance can be improved and the manufacturing cost can be reduced. In addition, visibility of the display device employing the touch panel can be improved.

BRIEF DESCRIPTION OF DRAWINGS

FIG. 1 is a plan view of a touch panel according to the first embodiment;

FIG. 2 is a sectional view taken along line II-II of FIG. 1;

FIG. 3 is an enlarged plan view of an "A" portion shown in FIG. 1;

FIG. 4 is a sectional view of a touch panel according to the second embodiment;

FIG. 5 is a sectional view of a touch panel according to the third embodiment;

FIG. 6 is a sectional view of a touch panel according to the fourth embodiment; and FIG. 7 is a sectional view of a touch panel according to the fifth embodiment.

MODE FOR THE INVENTION

In the description of the embodiments, it will be understood that, when a layer (or film), a region, a pattern, or a structure is referred to as being on or under another substrate, another layer (or film), another region, another pad, or another pattern, it can be "directly" or "indirectly on the other substrate, layer (or film), region, pad, or pattern, or one or more intervening layers may also be present. Such a position of the layer has been described with reference to the drawings.

The thickness and size of each layer shown in the drawings may be exaggerated, omitted or schematically drawn for the purpose of convenience or clarity. In addition, the size of elements does not utterly reflect an actual size.

Hereinafter, the embodiments will be described in detail with reference to the accompanying drawings.

First, a touch panel according to the first embodiment will be described in detail with reference to FIGS. 1 to 3.

FIG. 1 is a plan view of the touch panel according to the first embodiment, FIG. 2 is a sectional view taken along line II-II of FIG. 1, and FIG. 3 is an enlarged plan view of an "A" portion shown in FIG. 1.

Referring to FIGS. 1 and 2, an effective area AA for detecting a position of an input device and a dummy area located around the effective area AA are defined in the touch panel 100 according to the first embodiment.

A transparent electrode 40 may be formed on the effective area AA to detect the input device. In addition, a wire 50 connected to the transparent electrode 40 and a printed circuit board 60 for connecting the wire 40 to an external circuit (not shown) may be formed on the dummy area DA. An outer dummy layer 20 may be formed on the dummy area DA, and a logo 20a is formed on the outer dummy layer 20. Hereinafter, the touch panel 100 having the above structure will be described in more detail.

Referring to FIG. 2, the outer dummy layer 20, an intermediate layer 30 and the transparent electrode 40 are formed on the substrate 10. The wire 50 is connected to the transparent electrode 40 and the printed circuit board 60 is connected to the wire 50. In addition, a shatter prevention film 70 can be formed while covering the transparent electrode 40, the wire 50 and the printed circuit board 60.

The substrate 10 may include various materials capable of supporting the outer dummy layer 20, the intermediate layer 30, the transparent electrode 40 and the wire 50, which are formed on the substrate 10. For instance, the substrate 10 may include a glass substrate or a plastic substrate.

The outer dummy layer 20 can be formed on the dummy area DA of a first surface 12 (hereinafter, referred to as a bottom surface). The outer dummy layer 20 can be coated with a material having a predetermined color such that the wire 50 and the printed circuit board 60 are not visible from the outside. The outer dummy layer 20 may have a color suitable for an external appearance. For instance, the outer dummy layer 20 may include a black pigment to represent a black color. In addition, the logo 20a (see, FIG. 1) can be formed on the outer dummy layer 20 through various methods. The outer dummy layer 20 can be formed through the deposition, printing, or wet coating scheme.

The intermediate layer 30 is formed on the bottom surface 12 of the substrate 10 while covering the intermediate layer 30. The intermediate layer 30 is formed on the whole area of the bottom surface 12.

The intermediate layer 30 may include oxide or fluoride having the refractive index of 1.35 to 2.7.

The intermediate layer 30 may include Mg fluoride, Si oxide, Al oxide, Ce fluoride, In oxide, Hf oxide, Zr oxide, Pb oxide, Ti oxide, Ta oxide, Nb oxide, Al fluoride, or Zn sulfide. The intermediate layer 30 has a specific refractive index for the purpose of the index matching.

The intermediate layer 30 may be prepared as a single layer or a multiple layer such that the intermediate layer 30 has a specific refractive index. For instance, a first layer 22 having a high refractive index and a second layer 24 having a low refractive index can be sequentially formed on the substrate 10 in order to improve the transmittance of the touch panel 100 at the effective area AA.

For example, the first layer 22 may include Ta oxide, Ti oxide, Nb oxide, Zr oxide, Pb oxide, or Zn sulfide having the higher refractive index, and the second layer 24 may include Si oxide or Al fluoride having the lower refractive index. In detail, the Ti oxide has the refractive index of 2.2, the Nb oxide has the refractive index of 2.4, and the Si oxide has the refractive index of 1.4. In this case, the transmittance of the touch panel 100 may be improved up to 90%, preferably, 92%, maximally, 99%. Although one first layer 22 and one second layer 24 are sequentially stacked in the drawing, the embodiment is not limited thereto. According to the embodiment, a plurality of first layers 22 and a plurality of second layers 24 can be alternately stacked.

The reflectance of the intermediate layer 30 may correspond to the reflectance of the transparent electrode 40. That is, the reflectance of the transparent electrode 40 may vary depending on the material for the transparent electrode 40 and the reflectance of the intermediate layer 30 may vary depending on the material for the transparent electrode 40. In other words, the reflectance of the intermediate layer 30 may be set corresponding to the reflectance of the transparent electrode 40 by varying the stack structure of the intermediate layer 30.

The intermediate layer 30 may be formed through the deposition process. In detail, the intermediate layer 30 may be formed through the reactive sputtering process. That is, inert gas (Ar or Ne) together with oxygen ($O_2$) and/or nitrogen ($N_2$) is introduced into a sputtering device equipped with a metal deposition source and a deposition target, so that the metal deposition source is oxidized and deposited on the deposition target.

The transparent electrode 40 is formed on the intermediate layer 30. The transparent electrode 40 may have various shapes to detect the contact of the input device, such as a finger.

For instance, as shown in FIG. 3, the transparent electrode 40 may include first and second electrodes 42 and 44. The first and second electrodes 42 and 44 may include sensor parts 42a and 44a to detect the contact of the input device, such as a finger, and connection parts 42b and 44b to connect the sensor parts 42a and 44a. The connection parts 42b of the first electrode 42 connects the sensor parts 42a to each other in the first direction (transverse direction in FIG. 3) and the connection parts 44b of the second electrode 44 connects the sensor parts 44a to each other in the second direction (longitudinal direction in FIG. 3).

An insulating layer 46 is positioned at the intersection between the connection parts 42b of the first electrode 42 and the connection parts 44b of the second electrode 44 to prevent the electric short between the first and second electrodes 42 and 44. The insulating layer 46 may include a transparent insulating material capable of insulating the connection parts 42b and 44b from each other. For instance, the insulating layer 46 may include metal oxide, such as silicon oxide, or resin, such as acryl.

According to the embodiment, for example, the sensor parts 42a and 44a of the first and second electrodes 42 and 44 are aligned on the same layer, so that the sensor parts 42a and 44a can be formed on a single layer. In this case, the usage of the transparent conductive material can be minimized and the thickness of the touch panel 100 can be reduced.

If the input device, such as a finger, comes into contact with the touch panel 100, capacitance variation may occur at a region making contact with the input device, so the region is detected as a contact position. According to the embodiment, the transparent electrode 40 is employed in the capacitive touch panel, but the embodiment is not limited thereto. The transparent electrode 40 can be employed in the resistive touch panel.

The transparent electrode 40 may include a transparent conductive material such that electricity can flow through the transparent electrode 40 without interfering with the transmission of the light. To this end, the transparent electrode 40 may include various materials, such as indium tin oxide, indium zinc oxide, copper oxide, Ag nanowire or carbon nano tube (CNT).

The Ag nanowire can be formed through the synthesis with solvent, catalyst, metallic compound and additives. The light transmittance and electrical characteristic can be more improved due to the transparent electrode 40 having the Ag nanowire.

The transparent electrode 40 can be formed through the deposition process, such as the reactive sputtering process. If the transparent electrode 40 includes the indium tin oxide, the content of tin may be 10% or less. In this case, the light transmittance can be improved and electric conductivity can be enhanced by crystallizing the indium tin compound through the annealing process. However, the embodiment is not limited to the above. The transparent electrode 40 can be formed through various methods.

Referring again to FIG. 2, the wire 50 connected to the transparent electrode 40 and the printed circuit board 60 connected to the wire 50 are formed in the dummy area DA of the substrate 10. Since the wire 50 is located in the dummy area DA, the wire 50 is made from a metal having superior electric conductivity. The printed circuit board 60 may include various types of printed circuit boards. For instance, a flexible printed circuit board (FPCB) can be used as the printed circuit board 60.

The shatter prevention film 70 covers the intermediate layer 30, the transparent electrode 40, the wire 50 and the printed circuit board 60. The shatter prevention film 70 prevents particles from being shattered when the touch panel 100 is broken due to the impact applied thereto. The shatter prevention film 70 may have various materials and structures. According to the embodiment, the shatter prevention film 70 is located at the bottom surface 12 of the substrate 10, but the embodiment is not limited thereto. The shatter prevention film 70 can be located at various positions.

According to the touch panel 100 of the embodiment, the outer dummy layer 20 and the transparent electrode 40 are aligned on the same substrate 10. Thus, the process for manufacturing the substrate formed with the outer dummy layer separately from the transparent electrode film and then bonding the substrate with the transparent electrode film may not be necessary. Thus, the use of OCA (optically clear adhesive) representing inferior workability is not required, so that the defect rate can be reduced and the reliability can be improved. In addition, since the stack structure of the touch panel 100 is simplified, the transmittance can be enhanced, the thickness of the touch panel 100 can be reduced and the manufacturing cost can be reduced.

The intermediate layer 30 capable of performing the index matching is interposed between the substrate 10 and the transparent electrode 40 such that the transparent electrode 40 can be aligned on the intermediate layer 30. Due to the index matching, the transmittance, the reflectance and the yellowish properties can be optimized.

According to the related art, an expensive material consisting of polyethylene terephthalate (PET) and indium tin oxide is used to form the transparent electrode 40 by taking the light transmittance into consideration. However, according to the embodiment, the light transmittance is at least 90% or above due to the intermediate layer 30 performing the index matching, so the transparent electrode 40 can be directly formed on the intermediate layer 30 while improving the light transmittance, the reflectance and the yellowish of the touch panel 100. Thus, the expensive material is not necessary, so that the manufacturing cost can be reduced while improving the light transmittance.

In addition, due to the index matching, the transparent electrode 40 including the transparent conductive material may be invisible. In particular, the intermediate layer 30 may have the reflectance corresponding to that of the transparent electrode 40, so that the pattern of the transparent electrode 40 may be invisible. Thus, the visibility of the display device employing the touch panel 100 can be improved.

Hereinafter, a touch panel according to the second embodiment will be described in more detail with reference to FIG. 4. For the purpose of clarification, the description about the elements and structures that have been explained in the first embodiment will be omitted and the following description will be focused on the elements and structures different from those of the first embodiment.

FIG. 4 is a sectional view of the touch panel 200 according to the second embodiment.

Referring to FIG. 4, the touch panel 200 according to the second embodiment, the outer dummy layer 20 is formed on the top surface 14 of the substrate 10 and a protective layer 80 is formed to cover the outer dummy layer 20.

The outer dummy layer 20 is formed in the dummy area DA and a specific logo can be formed on the outer dummy layer 20. The protective layer 80 may include Ti oxide, Nb oxide, Ta oxide, Zr oxide or Pb oxide having the higher refractive index. The light transmittance can be more improved due to the protective layer 80 having the higher refractive index. In addition, the protective layer 80 can be prepared as a hard coating layer to prevent the protective layer 80 from being scratched.

Hereinafter, a touch panel according to the third embodiment will be described in more detail with reference to FIG. 5.

FIG. 5 is a sectional view of the touch panel according to the third embodiment.

Referring to FIG. 5, the touch panel 300 according to the third embodiment includes an anti-reflective layer 35 formed on the transparent electrode 40. In detail, the anti-reflective layer 35 is formed on a bottom surface of the transparent electrode 40.

The anti-reflective layer 35 may attenuate the reflection of the light in the visible ray band to prevent the glare phenomenon or the blind screen phenomenon caused by the reflection of the light. In other words, the anti-reflective layer 35 can effectively reduce the bad affect of the light reflection, thereby improving the resolution and the visibility of the image.

In addition, the anti-reflective layer 35 may improve the transmittance of the touch panel 300 up to 90%, preferably, 92%, maximally, 99%.

The anti-reflective layer 35 may include oxide or fluoride having the refractive index of 1.35 to 2.7. This refractive index is determined by taking the anti-reflection function into consideration. The anti-reflective layer 35 can be formed by stacking at least one layer including materials having refractive indexes different from each other.

In detail, the anti-reflective layer 35 may include Mg fluoride, Si oxide, Al oxide, Ce fluoride, In oxide, Hf oxide, Zr oxide, Pb oxide, Ti oxide, Ta oxide, Nb oxide, Al fluoride, or Zn sulfide.

According to the present embodiment, the anti-reflective layer 35 may include at least one layer. In detail, the anti-reflective layer 35 may includes a first layer 32 formed on the bottom surface 12 of the substrate 10 and a second layer 34 formed on the first layer 32 and having the second refractive index lower than the first refractive index of the first layer 32. In other words, the anti-reflective layer 35 can be formed by sequentially stacking the first layer 32 having the higher refractive index and the second layer 34 having the lower refractive index on the substrate 10 such that the anti-reflective layer 35 can attenuate the light reflection while improving the transmittance of the touch panel 300 at the effective area AA.

The first layer 32 is formed by using a material having the higher refractive index, and the second layer 34 is formed by using a material having the lower or middle refractive index. Otherwise, the first layer 32 can be formed by using a material having the middle refractive index, and the second layer 34 can be formed by using a material having the lower refractive index.

For instance, the material having the lower refractive index includes $MgF_2$ or $SiO_2$. The $MgF_2$ has the refractive index of 1.38 and the $SiO_2$ has the refractive index of 1.46.

The material having the middle refractive index includes $Al_2O_3$, $CeF_3$, SiO, $In_2O_3$, or $HfO_2$. The $Al_2O_3$ has the refractive index of 1.62, and the $CeF_3$ has the refractive index of 1.63. In addition, the SiO, $In_2O_3$ and $HfO_2$ have the refractive index of 2.00.

The material having the higher refractive index includes $ZrO_2$, $Pb_5O_{11}$, $TiO_2$, $Ta_2O_5$, $Nb_2O_5$, or $TiO_2$. The $ZrO_2$ has the refractive index of 2.10. If the $Pb_5O_{11}$ is used together with the $TiO_2$, the refractive index is 2.10. The $Ta_2O_5$ has the refractive index of 2.15, the $Nb_2O_5$ has the refractive index of 2.2 to 2.4, and the $TiO_2$ has the refractive index of 2.2 to 2.7.

Although one first layer 32 and one second layer 34 are sequentially stacked in the drawing, the embodiment is not limited thereto. According to the embodiment, a plurality of first layers 32 and a plurality of second layers 34 can be alternately stacked.

According to the present embodiment, the first layer 32 having the higher refractive index is primarily formed on the substrate 10 and then the second layer 34 having the lower refractive index is formed, but the embodiment is not limited thereto. It is also possible to primarily form the second layer 34 having the lower refractive index before the first layer 32 having the higher refractive index has been formed.

The refractive index of the anti-reflective layer 35 may correspond to the refractive index of air. In detail, the anti-reflective layer 35 may have the refractive index of 1.0. In this case, the reflectance can be lowered and the transmittance of the touch panel 300 can be improved.

The anti-reflective layer 35 can be formed through the sputtering process or the roll to roll process. According to the sputtering process, ionized atoms are accelerated by the electric field so that the ionized atoms collide with the source material. Thus, the atoms of the source material are deposited. According to the roll to roll process, a material, such as a paper or a film, is wound around a roll and the anti-reflective layer 35 is formed by the roll.

According to the present embodiment, the light transmittance is at least 90% or above due to the anti-reflective layer 35 performing the index matching, so the transparent electrode 40 can be directly formed on the substrate while improving the light transmittance of the touch panel 300. Thus, the expensive material is not necessary, so that the manufacturing cost can be reduced while improving the light transmittance.

Hereinafter, a touch panel according to the fourth embodiment will be described in more detail with reference to FIG. 6.

FIG. 6 is a sectional view of the touch panel according to the fourth embodiment.

Referring to FIG. 6, the touch panel 400 according to the fourth embodiment includes the outer dummy layer 20 formed on the second surface (top surface) 14 of the substrate 10 and the protective layer 80 covering the outer dummy layer 20.

Hereinafter, a touch panel according to the fifth embodiment will be described in more detail with reference to FIG. 7.

FIG. 7 is a sectional view of the touch panel according to the fifth embodiment.

Referring to FIG. 7, the touch panel 500 according to the fifth embodiment includes both of the intermediate layer 30 and the anti-reflective layer 35. In detail, the intermediate layer 30 is formed on the bottom surface of the substrate 10, the transparent electrode 40 is formed on the bottom surface of the intermediate layer 30 and the anti-reflective layer 35 is formed on a bottom surface of the transparent electrode 40. Thus, the touch panel 500 according to the fifth embodiment may optimize the light transmittance and reflectance.

Any reference in this specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A touch panel comprising:
   a monolithic substrate comprising a top surface and a bottom surface;
   an intermediate layer on the bottom surface of the substrate; a transparent electrode on the bottom surface of the substrate; wherein a reflectance of the intermediate layer corresponds to a reflectance of the transparent electrode and
   an outer dummy layer on the bottom surface of the substrate;
   wherein the outer dummy layer is in direct physical contact with bottom surface of the substrate,
   wherein the transparent electrode comprises:
   a plurality of first electrodes extending in a first direction; and
   a plurality of second electrodes extending in a second direction different from the first direction;
   wherein the first electrodes and the second electrodes are insulated from each other,
   wherein the first direction intersects the second direction,
   wherein the first electrodes and the second electrodes are disposed on a same surface of the intermediate layer,
   wherein the first electrodes and the second electrodes are in direct physical contact with the intermediate layer, wherein the substrate comprises an effective area and a dummy area,
wherein the outer dummy layer is disposed on the dummy area,
wherein the intermediate layer is disposed on the effective area and the dummy area,
wherein the intermediate layer is disposed on the outer dummy layer at the dummy area,
wherein the transparent electrode and the outer dummy layer are disposed on different layers, respectively,
wherein the outer dummy layer is disposed on the substrate,
wherein the transparent electrode is disposed on the intermediate layer,
wherein the top surface of the substrate is a contact surface of an input device,
wherein the outer dummy layer is surrounded by the intermediate layer,
wherein the transparent electrode comprises indium tin oxide having a content of tin of 10% or less, and
wherein the touch panel has a transmittance in a range of 95% to 99%.

2. The touch panel of claim 1, wherein the intermediate layer includes oxide or fluoride.

3. The touch panel of claim 2, wherein the oxide or fluoride has a refractive index in a range of 1.35 to 2.7.

4. The touch panel of claim 1, wherein the intermediate layer includes:
a first layer having a first refractive index on the bottom surface of the substrate; and
a second layer having a second refractive index lower than the first refractive index on the first layer.

5. The touch panel of claim 4, wherein the intermediate layer includes at least one selected from the group consisting of Mg fluoride, Si oxide, Al oxide, Ce fluoride, In oxide, Hf oxide, Zr oxide, Pb oxide, Ti oxide, Ta oxide, Nb oxide, Al fluoride and Zn sulfide.

6. The touch panel of claim 4, wherein the first layer includes at least one selected from the group consisting of Ta oxide, Ti oxide, Nb oxide, Zr oxide, Pb oxide and Zn sulfide, and the second layer includes at least one selected from the group consisting of Si oxide and Al fluoride.

7. The touch panel of claim 1, further comprising:
a wire connected to the transparent electrode; and
a shatter prevention film covering the transparent electrode and the wire.

8. The touch panel of claim 1, wherein the substrate comprises glass.

9. The touch panel of claim 1, wherein the substrate is a cover substrate.

10. A touch panel comprising:
a monolithic substrate comprising a top surface and a bottom surface;
an intermediate layer on the bottom surface of the substrate;
a transparent electrode on the bottom surface of the substrate;
an anti-reflective layer on the transparent electrode; and
an outer dummy layer on the first-bottom surface of the substrate;
wherein the outer dummy layer is in direct physical contact with the bottom surface of the substrate,
wherein the intermediate layer is an index matching layer,
wherein the transparent electrode comprises:
a plurality of first electrodes extending in a first direction; and
a plurality of second electrodes extending in a second direction different from the first direction;
wherein the first electrodes and the second electrodes are insulated from each other,
wherein the first direction intersects the second direction,
wherein the first electrodes and the second electrodes are disposed on a same surface of the intermediate layer,
wherein the first electrodes and the second electrodes are in direct physical contact with the intermediate layer,
wherein the substrate comprises an effective area and a dummy area,
wherein the outer dummy layer is disposed on the dummy area,
wherein the intermediate layer is disposed on the effective area and the dummy area,
wherein the intermediate layer is disposed on the outer dummy layer at the dummy area,
wherein the transparent electrode and the outer dummy layer are disposed on different layers, respectively,
wherein the outer dummy layer is disposed on the substrate,
wherein the transparent electrode is disposed on the intermediate layer,
wherein the top surface of the substrate is a contact surface of an input device,
wherein the outer dummy layer is surrounded by the intermediate layer,
wherein the transparent electrode comprises indium tin oxide having a content of tin of 10% or less, and
wherein the touch panel has a transmittance in a range of 95% to 99%.

11. The touch panel of claim 10, wherein a reflectance of the intermediate layer corresponds to a reflectance of the transparent electrode.

12. The touch panel of claim 10, wherein the refractive index of the anti-reflective layer corresponds to 1.

13. The touch panel of claim 10, wherein the anti-reflective layer is an index matching layer.

14. The touch panel of claim 10, wherein the substrate comprises glass.

15. The touch panel of claim 10, wherein the substrate is a cover substrate.

* * * * *